United States Patent
Stammen

[11] Patent Number: 5,690,146
[45] Date of Patent: Nov. 25, 1997

[54] HOSE AND METHOD FOR WEAR DETECTION

[75] Inventor: David A. Stammen, Sylvania, Ohio

[73] Assignee: Aeroquip Corporation, Maumee, Ohio

[21] Appl. No.: 700,036

[22] Filed: Aug. 20, 1996

[51] Int. Cl.$^6$ ........................................ F16L 11/04
[52] U.S. Cl. .............................. 138/36; 138/104; 138/137; 138/140; 116/208
[58] Field of Search ................... 138/36, 104, 111, 138/140, 137; 116/208; 73/40.7, 49.1

[56] References Cited

U.S. PATENT DOCUMENTS

| | | | |
|---|---|---|---|
| 3,261,388 | 7/1966 | Kovac et al. | 116/208 X |
| 3,911,959 | 10/1975 | Frank | 138/36 |
| 4,119,123 | 10/1978 | Samuels | 138/36 X |
| 4,153,079 | 5/1979 | Ambrose | 138/104 |
| 4,212,328 | 7/1980 | Yamamoto | 138/138 |
| 4,261,390 | 4/1981 | Belofsky | 138/125 |
| 4,474,217 | 10/1984 | DeMarse et al. | 138/104 X |
| 4,735,083 | 4/1988 | Tenenbaum | 138/36 X |
| 5,024,755 | 6/1991 | Livsey | 209/211 |
| 5,093,166 | 3/1992 | Nishimura | 138/137 X |
| 5,167,259 | 12/1992 | Brunnhofer | 138/137 |
| 5,228,478 | 7/1993 | Kleisle | 138/104 |
| 5,303,756 | 4/1994 | Hill | 152/154.2 |
| 5,313,909 | 5/1994 | Tseng et al. | 116/208 |
| 5,322,031 | 6/1994 | Lerner et al. | 116/208 |
| 5,356,681 | 10/1994 | Ichikawa et al. | 138/140 X |
| 5,388,331 | 2/1995 | Siamak | 116/208 X |
| 5,474,194 | 12/1995 | Hellman et al. | 215/230 |
| 5,488,974 | 2/1996 | Shiota et al. | 138/125 |

FOREIGN PATENT DOCUMENTS 2552508   5/1977   Germany ........................ 138/104

OTHER PUBLICATIONS

PCT Application WO 94/02772 Doan T., Feb. 1994.

*Primary Examiner*—Patrick Brinson
*Attorney, Agent, or Firm*—Emch, Schaffer, Schaub & Porcello Co.

[57] ABSTRACT

The present invention indicates excessive wear on the outer cover of a hose in order to help avoid unexpected ruptures and spills. The invention is a hose with an outer cover. The outer cover has two layers made of rubber or plastic. The outer cover has an inner layer of one color (e.g. yellow) and an outer layer of another color (e.g. black). When the outer cover wears down to expose color of the inner layer, the end user is made aware that outer cover wear is approaching the reinforcement layer and that the hose should be replaced.

16 Claims, 2 Drawing Sheets

HOSE AND METHOD FOR WEAR DETECTION

TECHNICAL FIELD

This invention relates to hoses. The invention also relates to a method for detecting wear in the outer cover of the hose.

BACKGROUND ART

Industrial and commercial uses frequently pull the hoses across rough concrete floors and roads. A disadvantage of prior art hoses is that substantial wear, approaching the point of rupture, is not immediately obvious upon a cursory visual inspection of the hose. Consequently, the user of the hose often is surprised by a lack of serviceable hose, and is unexpectedly unable to avoid spills.

Abrasion resistance of the outer cover of rubber hoses is becoming more and more of an environmental concern. In hydraulic hoses having textile or wire reinforcement, corrosion of the wire or abrasion of the fabric soon follow the wearing out of the outer cover. Once this happens, failure of the hose may occur.

DISCLOSURE OF THE INVENTION

The present invention indicates excessive wear on the outer surface of a hose in order to avoid unpredictable hose life and unexpected ruptures and spills. The invention is a hose with a coextruded or layered outer cover. The outer cover has an inner layer of one color (e.g. yellow) and an outer layer of another color (e.g. black). When the outer cover wears down to expose the yellow layer, the end user is made aware that hose wear is approaching the reinforcement layer which results in reduced hose life.

Simple abrasion testing shows that a sharp contrast in color provides an early warning hose. Prior art hoses using transparent or translucent color in one layer does not provide a stark enough contrast. Moreover, the prior art colors are incorporated to detect internal leaks as opposed to external wear.

BRIEF MODE OF CARRYING OUT INVENTION

Figure 1:
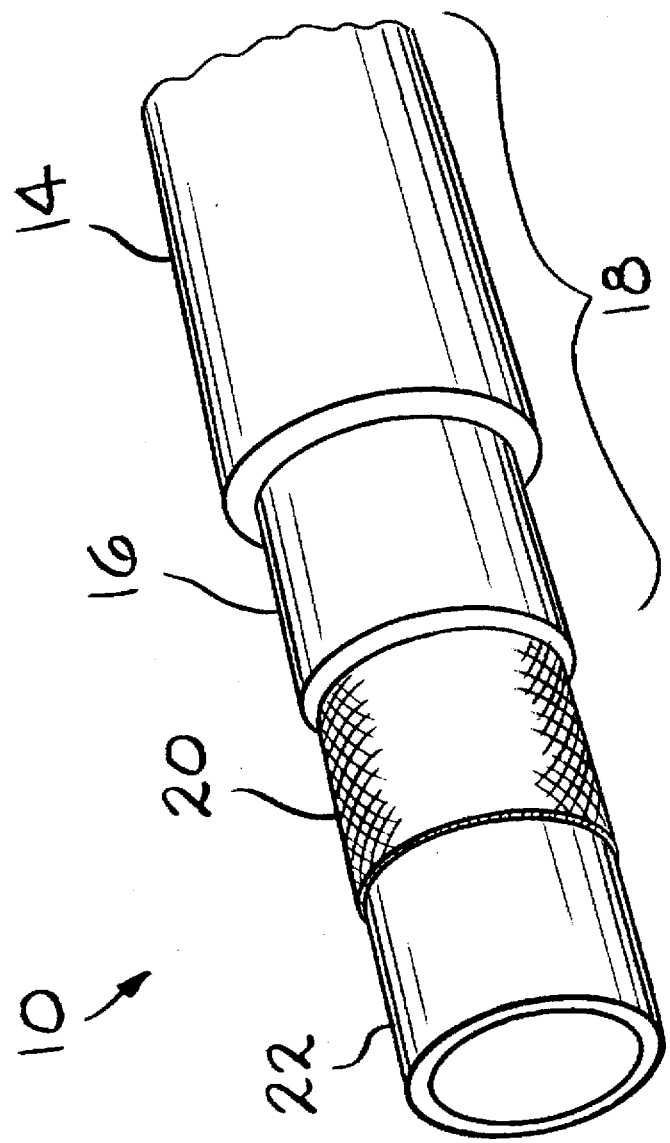
FIG. 1 is a perspective view, partly cut away, illustrating the hose of this invention.

FIG. 1 shows hose 10 of this invention. Hose 10 is a multi-layer structure which comprises outer layer 14 and inner layer 16. Outer layer 14 and inner layer 16 make up outer cover 18 of hose 10. In other embodiments, hose 10 may include reinforcing layer 20, intermediate layer 22 or both layers 20 and 22.

Figure 2:
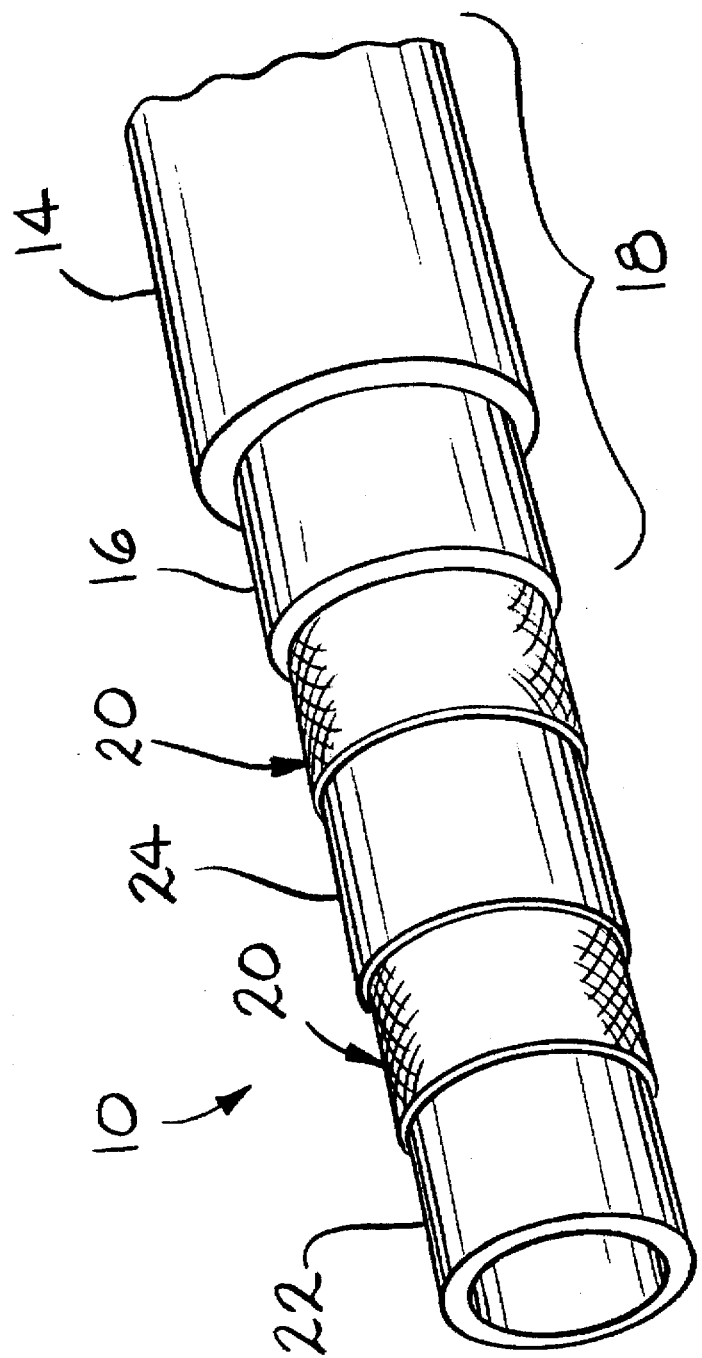
FIG. 2 is the hose of FIG. 1 with multiple reinforcement of layers.

FIG. 2 shows hose 10 with multiple intermediate layers 22. Intermediate layer 24 typically separates all reinforcing layers.

A hose, according to the invention comprises an outer cover consisting essentially of an opaque-colored outer layer and an opaque-colored inner layer wherein the layers have different colors and wherein abrasion of the outer layer reveals the color of the inner layer thereby acting as a wear indicator for the outer cover. The combination of colors is an early warning system for detecting wear-through of the outer cover. Exposing the color of the inner layer in this fashion is a visual indicator of abrasive outer wear of the hose.

The materials and construction of the hose are not critical. My invention may be applied to a wide variety of hose materials and construction. For example, I can use my invention with thermoplastic hoses such as the hoses described in U.S. patent application Ser. No. 08/512,846 filed Aug. 9, 1995. I also can use my invention with a wide variety of thermoset rubber hoses available. See U.S. Pat. Nos. 5,356,681 and 5,488,974.

Layers 14, 16, 22 and 24 can vary widely and also may be a thermoplastic elastomer (TPE) with functional properties and performance of a conventional thermoset rubber, but the processing characteristics of a thermoplastic.

Outer layer 14, inter layer 16 and intermediate layers 22 and 24 also may be a thermoset rubber. The thermosetting rubbers in layers 14, 16 and 22 can vary widely and can be any natural or synthetic rubber.

Typically, outer layer 14 has a thickness which only practical considerations limit. Generally, however, outer layer 14 has a thickness ranging from 0.030 inch to 0.250 inch. Preferably, the thickness ranges from 0.030 inch to 0.100 inch.

Reinforcement layers 20 varies widely. It can be formed by braiding natural fibers, synthetic fibers or metal wires. Synthetic fibers can be glass fibers, polyester fibers, Kevlar® fibers or Novex® fibers. The metal fibers usually are steel fibers. Frequently, reinforcement layer 20 is a textile fabric. Typically, reinforcing fabric is wrapped on a bias before application of outer cover 18.

In another embodiment, reinforcement layer 20 may be a helically wound spiral wire. A common combination for reinforcement layer 20 is the use of a reinforcement fabric with a spiral wire over the fabric beneath the outer cover.

Intermediate layer 22 is formed by extruding so as to have a thickness of usually 0.005 to 0.25 preferably 0.005 to 0.1 inch.

After extrusion molding of innermost layer 22, a braided or spirally wrapped fibrous reinforcement layer 20 and then external layer 18 are provided on innermost layer 22. Reinforcement layer 20 also may be a helical strand of coiled steel wire. For the fibrous reinforcement layer and the external layer, any conventional materials can be used as they are.

The composite flexible hose of the present invention is obtainable by, on the innermost layer, forming the intermediate rubber layer, the fibrous reinforcement layer and the external rubber layer, and then entirely vulcanizing. The vulcanization is preferably carried out under the conditions of a steam pressure of 4 to 5.5 $kgf/cm^2$ and a temperature of about 150° to 160° C.

The method of my invention for detecting outer wear in hose cover 18 comprises the steps of providing a hose having an inner layer 16 of one opaque color and outer layer 14 of a different opaque color and abrading the outer layer to reveal the color of the inner layer. Observing the color of the inner layer indicates wear-through of the outer cover. The color of the inner layer is an early warning system for detecting wear-through of the outer cover.

The opaque colors I use vary widely. Preferably, layer 14 is black and layer 16 is yellow. I also have used combinations of black and blue. The more contrast between colors, the better. While transparent or translucent colors may be used, they usually don't provide the contrast necessary for early detection.

Methods for fabricating the present hose assembly 10 are well known in the art. One particular well known method involves a two-part extrusion process typically known as "cross-head" extrusion. The typical "cross-head" extrusion method involves first extruding an inner layer 22, then extruding an outer cover 18, thereover. Coextrusion methods of fabricating also may be applicable. As commonly known in the art, coextrusion methods involve utilizing two extruders at once thereby forming both inner and outer layers simultaneously.

Coextrusion also preferably is used to form outer cover 18.

Firm bonding between layers 14 and 16 must be established.

In this regard, one method of producing two-ply cover 18 is simultaneous extrusion of the inner and outer layers. This method utilizes two sets of extruders so combined as to share a set of extrusion die assembly having concentrically arranged two annular orifices. One of the two extruders is connected to the inner orifice of the die while the other extruder is connected to the outer orifice of the die. The two extruders are operated simultaneously such that the inner and outer layers come into contact with each other while both the two kinds of rubbers are in plasticized state and are not yet exposed to the atmosphere. This method is efficient and has the advantage that a firm and reliable bonding of the two layers 14 and 16 can be accomplished.

Although the above described simultaneous extrusion method is preferable, the two-ply rubber can be produced also by a familiar two-stage extrusion method. In this case, the inner layer is formed by an ordinary extrusion technique as a first step, and then the outside of the inner layer may be coated with a thin layer of an adhesive, which may be a rubber. Thereafter, the outer layer of the core is processed. Staged processing or coextrusion may be used for all layers and may be used for thermoplastic or thermoset hoses as well.

In another embodiment, layer 16 of outer cover 18 may be wrapped instead of extruded. Wrapping layer 16 usually occurs directly before the cross-head of the extruder that extrudes layer 14 of outer cover 18.

In the following examples, layer 22 first was extruded followed by wrapping reinforcing layer 20 around layer 22. Layer 20 was a wire braid and layer 22 was a thermoset rubber. Next, layer 16 was wrapped over layer 20 followed extruding layer 14 over layer 16. Layers 14 and 16 were thermoset rubbers, but each had a different opaque color.

EXAMPLE I

I had a hose made having the following construction. The hose style was SAE 100R2; a high pressure, steel wire reinforced, rubber covered hydraulic hose. Outer layer 14 was a blue rubber cover. Inner layer 16 was a yellow rubber wear indicator layer. Reinforcing layer 20 was a wire braid. Layer 22 was a black inner tube. Simple abrasion wore through blue outer layer 14 and revealed yellow layer 16 after about 1,000 abrasion cycles. Observation of yellow layer 16 after 1,000 cycles is an early wear indicator and the hose should be replaced at that time. The cycles were carried out at an ambient temperature of about 73° F.

Blue cover 14 had a thickness of 0.025 inch and yellow layer 16 had a thickness of 0.015 inch. The cycles were carried out according to proposed ISO 6945:1991 (E).

EXAMPLE II

Additional samples of the hose of Example I were tested. Each test abraided four different sections of the hose. The results were as follows.

| Time | Cycles | Section Number 1 | 2 | 3 | 4 | Remarks |
|---|---|---|---|---|---|---|
| | | Hose One | | | | |
| 0925 | 0 | | | | | Ambient temp. 73° F. |
| 0932 | 715 | X | | | | Yellow layer visible |
| 0933 | 768 | | | | X | Wire visible |
| 0938 | 1057 | | | X | | Wire visible |
| 0945 | 1449 | | X | | | Yellow layer visible |
| | | Hose Two | | | | |
| 0950 | 0 | | | | | Ambient temp. 73° F. |
| 1000 | 587 | X | | | | Yellow layer visible |
| 1004 | 837 | | | X | | Wire visible |
| 1003 | 1055 | | | | X | Wire visible |
| 1010 | 1188 | | X | | | Yellow layer visible |

Again, the data shows yellow indicator layer 16 functioning as an early wear indicator. Exposure of colored layer 16 is an early wear indicator of the hose. Exposure of wire or reinforcing 20 layer of the hose indicates failure. The hose should be replaced at this time.

I claim:

1. A hose comprising:

an outer cover consisting essentially of an opaque-colored outer layer and an opaque-colored inner layer, both said layers having a continuous thickness along the length of the hose, wherein the layers have different colors and wherein abrasion of the outer layer reveals the color of the inner layer thereby acting as a wear indicator for the outer cover.

2. A hose comprising an inner layer of one opaque color, both said layers having a continuous thickness along the length of the hose, and an outer layer of a different opaque color wherein exposing the color of the inner layer is a visual indicator of abrasive outer wear of the hose.

3. A hose according to claim 1 comprising an inner layer in addition to the outer cover.

4. A hose according to claim 3 comprising a reinforcing layer between the inner layer and the outer cover.

5. A hose according to claim 1 wherein the layers of the outer cover consists essentially of thermosetting rubber.

6. A hose according to claim 1 wherein the layers of the outer cover consists essentially of a thermoplastic.

7. A hose according to claim 1 wherein said outer cover is a coextruded outer cover.

8. A method of detecting outer wear in a hose comprising the steps of providing a hose having an outer cover consisting essentially of of an inner layer of one opaque color, both said layers having a continuous thickness along the length of the hose, and an outer layer of a different opaque color and abrading the outer layer to reveal the color of the inner layer.

9. A method according to claim 8 wherein observing the color of the inner layer indicates wear-through of the outer cover.

10. A method according to claim 8 wherein observing the color of the inner layer is an early warning system for detecting wear-through of the outer cover.

11. A method according to claim 8 comprising the step coextruding the inner and outer layer to form the outer cover.

12. A method according to claim 8 comprising the steps of wrapping the inner layer of the outer cover and extruding the outer layer over the wrapped inner layer to form the outer cover.

13. A method according to claim 8 comprising the steps of first extruding the inner layer and then extruding the outer layer over the inner layer to form the outer cover.

14. A hose according to claim 1 wherein the outer layer is a continuous, extruded layer.

15. A hose according to claim 1 wherein the outer layer is a continuous, extruded tube.

16. A hose according to claim 1 wherein the inner layer is a continuous, extruded tube.

* * * * *